March 10, 1959

E. J. SELYEM 2,876,877

AUTOMATIC THROTTLE CONTROL

Filed Dec. 5, 1955

INVENTOR.
Edwin J. Selyem
BY
Paul Fitzpatrick
ATTORNEY

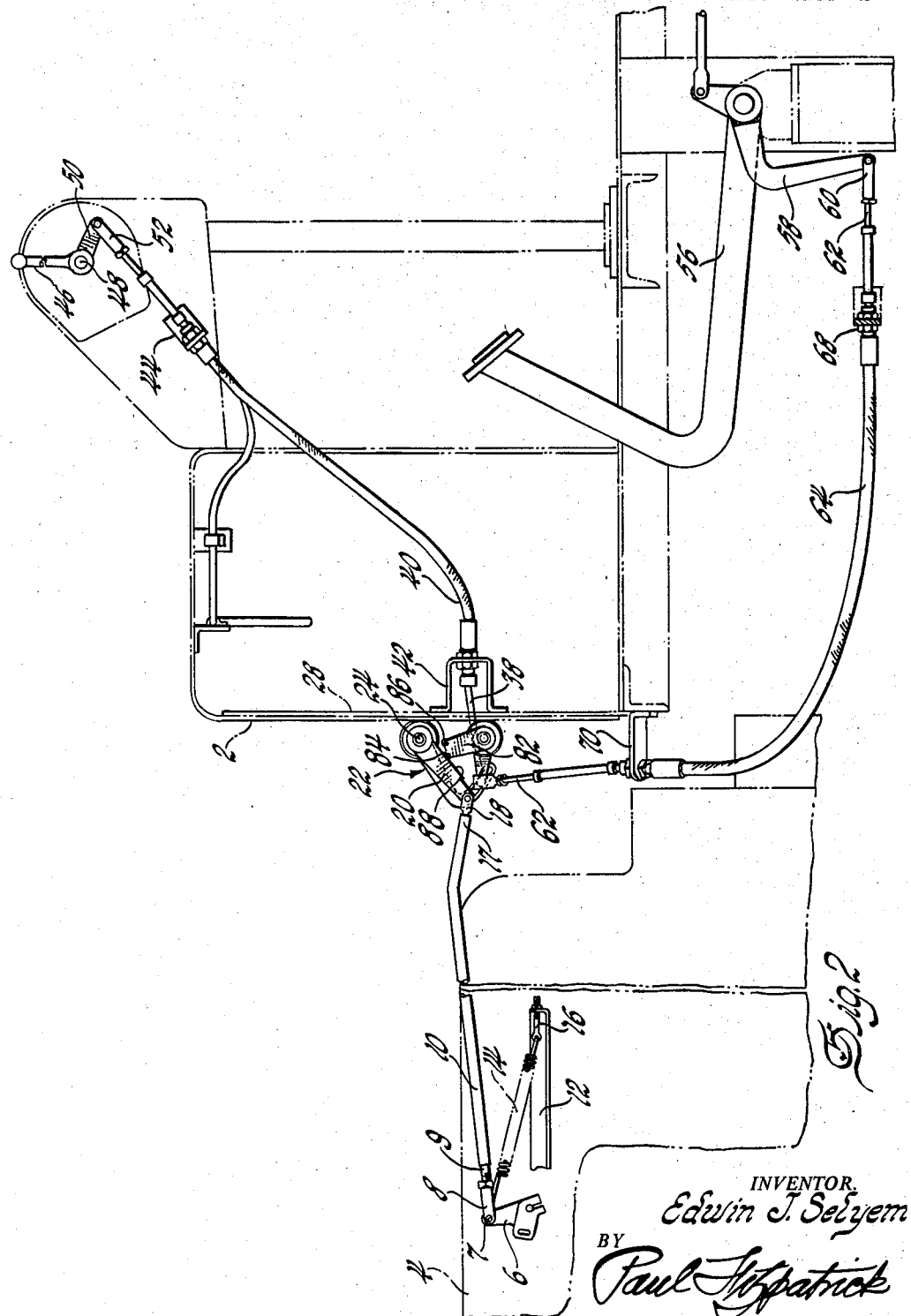

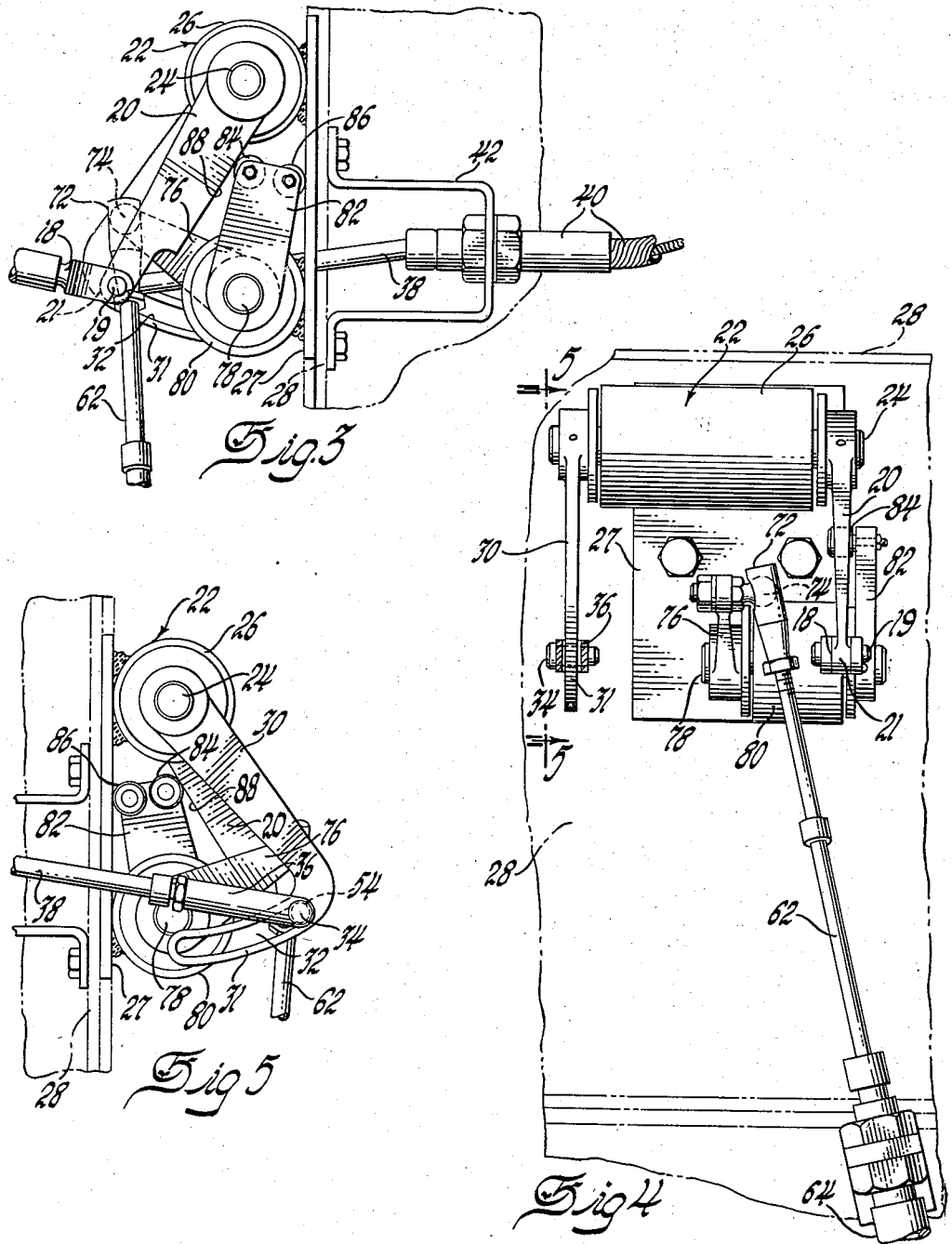

United States Patent Office 2,876,877
Patented Mar. 10, 1959

2,876,877

AUTOMATIC THROTTLE CONTROL

Edwin J. Selyem, North Royalton, Ohio, assignor to General Motors Corporation, Detroit, Mich., a corporation of Delaware Application December 5, 1955, Serial No. 550,916

8 Claims. (Cl. 192—3)

This invention relates to automatic throttle control mechanisms for vehicle engines and the like, and more particularly, although not exclusively, to vehicle brake responsive throttle mechanisms.

In certain types of vehicles, such as crawler tractors, it is customary to operate the engine at substantially full throttle. In certain types of crawler tractors, it is desirable that the engine be temporarily throttled to a fast idle, when the brakes are applied. Preferably, the engine should immediately return to full throttle as soon as the brake returns to the inoperative position.

In accordance with the general features of the present invention, a spring biased throttle linkage is provided with a manually controlled throttle lever which permits the engine speed to be positively adjusted to any desired level. The manual control is then locked in the desired position by any suitable means. The throttle linkage includes lost motion mechanism permitting movement of the throttle linkage in a throttle closing direction without disturbing the adjusted position of the manual control. A conventional brake pedal for operating the vehicle brakes has connected thereto additional linkage, which upon operation of the brake pedal, is effective to move the throttle linkage in a throttle closing direction until the engine speed is reduced to a fast idle. Upon release of the brake, the throttle linkage returns to the position previously determined by the manual throttle control lever.

An object of the invention is to provide an improved engine throttle control mechanism.

Another object is to provide a throttle control mechanism having a manual control capable of adjusting the throttle to any desired engine operating speed, and brake responsive mechanism acting independently of the throttle lever for temporarily returning the throttle to a fast idle position without disturbing the adjusted position of the manual control.

A further object is to provide a structure of the stated character wherein the brake responsive mechanism is effected during its initial increment of movement to return the throttle to a fast idle position.

Still a further object is to provide a structure of the stated character wherein the throttle is returned to a fast idle responsive to initial movement of the brake, the remaining increment of movement of the brake being ineffective to reduce the speed further.

Yet a further object is to provide a structure of the stated character which is simple in construction, low in cost and efficient in operation.

These and other objects, advantages and features of the invention will become more fully apparent as reference is had to the accompanying specification and drawings wherein:

Fig. 2 is a view similar to Fig. 1 showing the arrangement of linkage with the manual control lever set at normal engine operating speed and with the brake pedal depressed to return the throttle to fast idle position.

Fig. 3 is an enlarged fragmentary side elevational view of a portion of the structure shown in Figs. 1 and 2.

Fig. 4 is an enlarged fragmentary front elevational view looking in the direction or arrows 4—4 of Fig. 1; and Fig. 5 is an enlarged fragmentary side elevational view similar to Fig. 3 but viewed from the opposite side.

Figure 1:
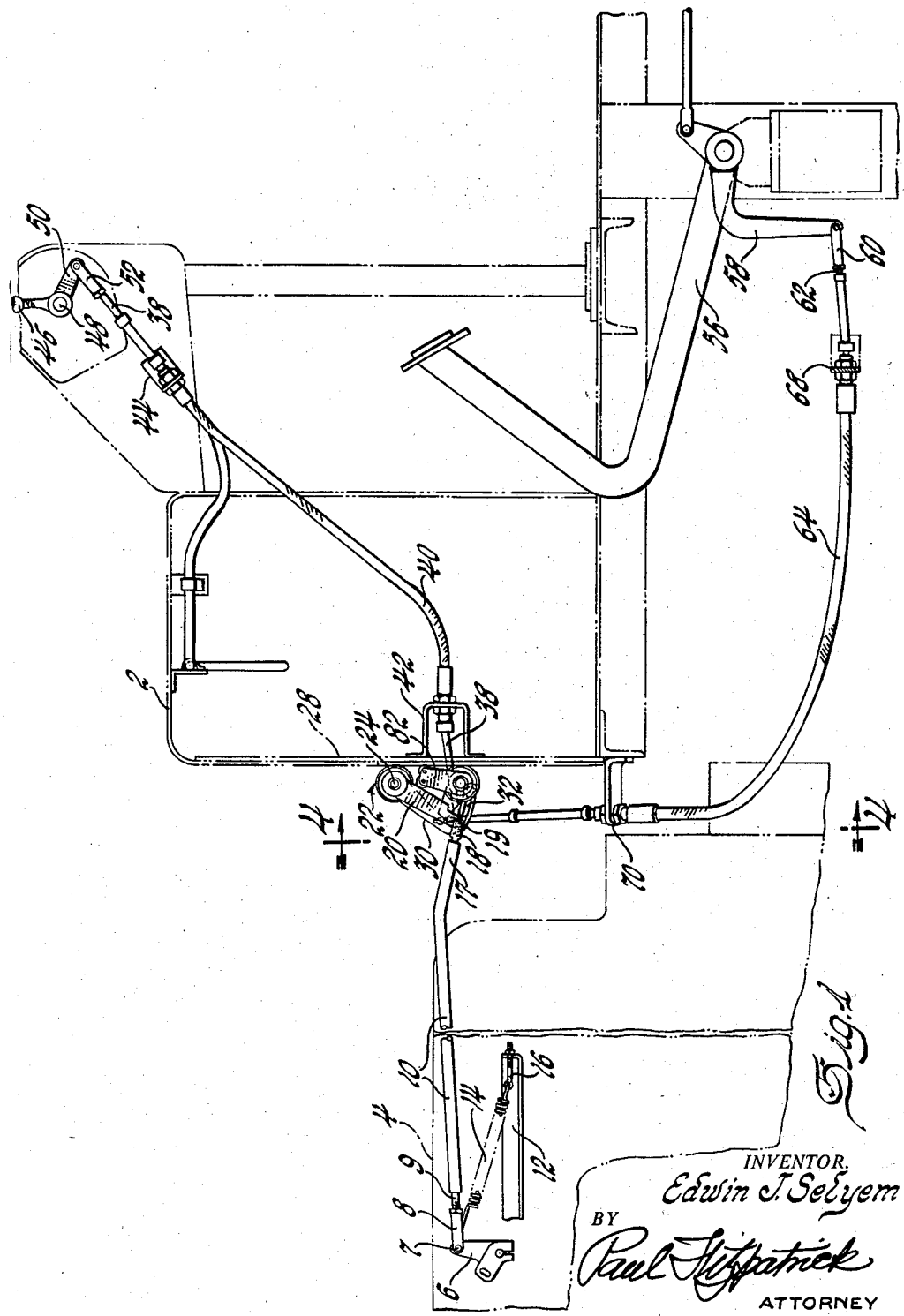
Fig. 1 is a side elevational view illustrating the form and arrangement of the invention, the mechanism being shown in a position wherein the throttle is adjusted to a normal engine operating speed.

Referring now to the drawings and particularly Fig. 1, there is illustrated in dotted lines a portion of a tractor superstructure 2. The reference numeral 4 generally designates the vehicle engine. Pivotally mounted on engine 4 is a bell crank throttle lever 6. At its upper end, bell crank 6 is pivotally connected by a pin 7 to a clevis 8 on the forward end 9 of a generally longitudinally extending throttle rod 10. Mounted on engine 4 rearwardly of crank 6 is a bracket 12. Extending diagonally between the rearward end of bracket 12 and the upper end of crank 6 is a tension spring 14. Spring 14 is connected at its forward end to pin 7 at the upper end of crank 6 and at its rearward end to an eye bolt 16. Bolt 16 is attached to bracket 12 and is adjustable relative thereto to cause spring 14 to exert tension effective to impart clockwise rotation to crank 6. It will be understood that crank 6 is connected to an engine carburetor, not shown, in such a manner that clockwise rotation of crank 6 causes movement of the carburetor throttle valve to full throttle position. At its rearward end 17, throttle rod 10 is formed with a clevis 18 which is pivotally connected by a pin 19 to the free end 21 of one arm 20 of a double armed intermediate lever structure 22. As seen best in Fig. 4, intermediate lever structure 22 comprises a transversely extending shaft 24 which is rotatably supported in a housing 26. Housing 26 is integral with attaching plate 27 which, in turn, is secured to the firewall 28 of vehicle body 2. At its opposite ends, shaft 24 has keyed thereto the arm 20 and another arm 30. Arms 20 and 30 are arranged in generally similar angular inclination relative to shaft 24. At its lower end, arm 30 is provided with an integral swept back portion 31 which is formed with an elongated slot 32. Extending into slot 32 is a pin 34 which is carried by a clevis structure 36. Clevis structure 36, in turn, is connected to the forward end of a Bowden cable 38. Cable 38 extends into a sheath 40, the forward end of which is secured to a bracket 42 on firewall 28 rearwardly adjacent intermediate lever structure 22. At its opposite end, sheath 40 is secured to a bracket 44 which is mounted adjacent a manually operable throttle control lever 46. Lever 46 is mounted in a location on the vehicle superstructure convenient to the operator and is swingable fore and aft about a transversely extending pivot 48. Integral with lever 46 is a crank arm 50, the free end of which pivotally engages a clevis 52 which, in turn, is connected to the opposite end of Bowden cable 38.

In operation, when lever 46 is progressively swung forwardly about pivot 48, cable 38 is moved bodily rearwardly through sheath 40 by the action of crank 50. Pin 34, therefore, moves bodily rearwardly in slot 32 of arm 30. However, because of the tension of spring 14, throttle rod 10 causes arm 20 to swing rearwardly. Consequently, arm 30 also moves rearwardly as rapidly as pin 34 is displaced by cable 38. Therefore, the forward end 54 of slot 32 follows pin 34 rearwardly until throttle crank 6 has moved the carburetor throttle valve, not shown, to full throttle position. Upon rearward swinging movement of lever 46, Bowden cable 38 moves forwardly causing pin 34 to forcibly engage the forward end 54 of slot 32 and swing both arms 30 and 20 of intermediate lever 22 forwardly. As arm 20 moves forwardly, throttle rod 10 is shifted longitudinally forwardly against the pressure of spring 14 and rotates throttle bell crank 6 to a position causing the carburetor throttle valve to move to closed position. It will thus be seen that manual throttle control lever 46 is effective to provide positive positions of adjustment of the throttle linkage when the former is moved in a throttle opening direction. However, since the pin 34, at the forward end of Bowden cable 38, is normally in abutting contact with the forward end 54 of slot 32, intermediate lever 22 may be rotated forwardly without disturbing the position of adjustment of lever 46.

In order to accomplish temporary forward displacement of the throttle rod 10 in accordance with the present invention, the vehicle brake pedal 56 is provided with a depending integral auxiliary arm 58. At its lower end, arm 58 is pivotally connected to a clevis 60, which, in turn, is secured to the rear end of a second Bowden cable 62. Cable 62 extends through a cable sheath 64 which is secured at its opposite ends to a bracket 68 and a bracket 70, respectively. Bracket 70 is disposed in general vertical alignment with intermediate lever 22. At its forward end, Bowden cable 62 is provided with a socket connection 72 which engages a ball stud 74 formed on the free end of a swingable arm 76. Arm 76, in turn, is connected to one end of a transversely extending pivot shaft 78. Shaft 78 is rotatably supported in a housing 80 which, in turn, is secured to attaching plate 27 below housing 26, previously mentioned. At its opposite end, shaft 78 has secured thereto a second arm 82 which is arranged at right angles to arm 78. At its free end, arm 82 is provided with a pair of cam rollers 84 and 86. Cam rollers are adapted for abutting engagement with the rear edge 88 of arm 20 of intermediate lever structure 22. As seen best in Fig. 1, when the brake pedal 56 is in the normal unengaged position, Bowden cable 62 maintains lever 82 in a substantially vertically extending position wherein the fore and aft swinging movement of arm 20 is unobstructed by either roller 84 or 86. However, when pedal 56 is depressed as shown in Fig. 2, Bowden cable 62 is shifted rearwardly in sheath 64 causing arm 82 to swing forwardly. As arm 82 swings forwardly, roller 84 cams arm 20 forwardly, which, in turn, shifts throttle rod 10 forwardly causing throttle lever 6 to move to a position providing a fast engine idle. When lever 82 has been swung forwardly to a position wherein the rear edge 88 of arm 20 is tangent with both of rollers 84 and 86, the engine idle speed is unaffected by further depressing of brake pedal 56. As soon as the brake is released, cable 62 actuates arm 82 rearwardly to the normal position shown in Fig. 1 whereupon spring 14 returns throttle rod 10 rearwardly until forward end 54 of slot 32 again abuts pin 34 of Bowden cable 38, thereby causing the engine to return to the normal operating speed established by the setting of manual control lever 46.

From the foregoing, it will be seen that a novel automatic throttle control structure has been provided. The device is not only simple in construction but, in addition, greatly improves the flexibility of operation of the vehicle while retaining all of the advantages of conventional manual throttle control mechanisms.

While but one embodiment of the invention has been shown and described, it will be apparent that other changes may be made therein. It is, therefore, to be understood that it is not intended to limit the invention to the embodiment shown, but only by the scope of the claims which follow.

What is claimed is:

1. In a vehicle having a brake, a throttle lever, a throttle rod connected at one end to said lever, an intermediate lever hinged on said vehicle, means connecting the opposite end of said rod to the free end of said intermediate lever, spring means urging said throttle lever to full throttle position, a manually adjustable throttle control lever, means connecting said control lever to said intermediate lever for positive driving engagement with the latter in a throttle closing direction, means associated with said last mentioned means permitting movement of said intermediate lever in a throttle closing direction without affecting the throttle control lever adjustment, a swingable arm pivotally supported adjacent said intermediate lever, means on said arm effecting positive driving engagement with said intermediate lever in a throttle closing direction independent of said throttle control lever, and means connecting said swingable arm to said brake pedal so that the former moves in a throttle closing direction responsive to operation of said brake.

2. In a vehicle having a brake, a throttle lever, a throttle rod connected at one end to said lever, an intermediate lever hinged on said vehicle, means connecting the opposite end of said rod to the free end of said intermediate lever, spring means urging said throttle lever to full throttle position, a manually adjustable throttle control lever, means connecting said control lever to said intermediate lever for positive driving engagement with the latter in a throttle closing direction, means associated with said last mentioned means permitting movement of said intermediate lever in a throttle closing direction without affecting the throttle control lever adjustment, a swingable arm pivotally supported adjacent said intermediate lever, a cam on said arm engageable with said intermediate lever and effective to provide positive driving engagement therewith in a throttle closing direction, and a cable connecting said arm and said brake whereby operation of said brake causes movement of said cam in a throttle closing direction.

3. The structure defined in claim 2 wherein said cam is formed and arranged so as to cause movement of said throttle lever to a partially closed throttle position responsive to initial movement of said brake, the relationship of said cam and said intermediate lever during the remaining increment of movement of said brake being such as to maintain said throttle lever in partially closed throttle position.

4. The structure defined in claim 2 wherein said cam comprises a plurality of rollers mounted on the free end of said arm.

5. The structure defined in claim 2 wherein said cam comprises a pair of spaced rollers pivotally mounted on the free end of said arm.

6. In a vehicle having a brake, a throttle lever, a throttle rod connected at one end to said lever, an intermediate lever hinged on said vehicle, means connecting the opposite end of said rod to the free end of said intermediate lever, spring means urging said throttle lever in a throttle opening direction thereby urging said intermediate lever in said direction about its hinged connection to said vehicle, a manually adjustable throttle control lever, means connecting said control lever to said intermediate lever by a lost motion connection to limit throttle opening movement of the latter under the urging influence of said spring while permitting movement of said intermediate lever in a throttle closing direction without affecting the throttle control lever adjustment, a swingable arm pivotally supported adjacent said intermediate lever, a cam on said arm engageable with said intermediate lever to move the latter in a throttle closing direction, and means connecting said arm and said brake whereby operation of said brake causes movement of said cam in a throttle closing direction.

7. In a vehicle, a throttle-operating linkage adapted for movement in throttle opening and closing directions, spring means continuously urging said throttle linkage in one direction, a manual throttle control lever controlling movement of said throttle linkage, an auxiliary control device controlling movement of said throttle linkage, and pivotally mounted lever means forming an operative connection between said throttle linkage and said manual throttle control lever and also between said throttle linkage and said auxiliary control device so that said lever means must pivot to move said throttle linkage in either of said directions, the connection of said throttle control lever to said lever means adjustably limiting movement of said throttle linkage in said one direction under the influence of said spring means and constituting a positive drive for moving said throttle linkage in the other of said directions, the connection of said auxiliary control devices to said lever means being operable to move said throttle linkage in said other direction independently of adjustment of said throttle control lever.

8. In a vehicle, a throttle-operating linkage adapted for movement in throttle opening and closing directions, spring means continuously urging said throttle linkage in one direction, lever means pivotally mounted on said vehicle and connected to said throttle linkage for movement with the latter, a manual throttle control lever operatively connected to said lever means to adjustably limit movement of said throttle linkage in said one direction under the influence of said spring means and constituting a positive drive for moving said throttle linkage in the other of said directions, and an auxiliary control device operatively connected to said lever means to move said throttle linkage in said other direction independently of adjustment of said throttle control lever.

References Cited in the file of this patent
UNITED STATES PATENTS

| | | |
|---|---|---|
| 1,810,128 | Chapel | June 16, 1931 |
| 1,986,461 | Bellis | Jan. 1, 1935 |
| 2,429,714 | Gedstad | Oct. 28, 1947 |
| 2,609,074 | Leihgeber | Sept. 2, 1952 |